(12) United States Patent  
Horiguchi et al.

(10) Patent No.: US 8,243,242 B2  
(45) Date of Patent: Aug. 14, 2012

(54) LIQUID CRYSTAL DISPLAY DEVICE, METHOD FOR PRODUCING SAME, AND ELECTRONIC APPARATUS

(75) Inventors: Masahiro Horiguchi, Tottori (JP); Hideki Kaneko, Tottori (JP); Shunichi Nakashima, Yazu (JP); Hiroyuki Ito, Tottori (JP)

(73) Assignee: Sony Corporation, Tokyo (JP)

( * ) Notice: Subject to any disclaimer, the term of this patent is extended or adjusted under 35 U.S.C. 154(b) by 724 days.

(21) Appl. No.: 12/179,168

(22) Filed: Jul. 24, 2008

(65) Prior Publication Data

US 2009/0086145 A1 Apr. 2, 2009

(30) Foreign Application Priority Data

Sep. 28, 2007 (JP) ................................. 2007-253582

(51) Int. Cl.  
    *G02F 1/1343* (2006.01)
(52) U.S. Cl. .......................... 349/141; 349/142; 349/143
(58) Field of Classification Search .................. None  
    See application file for complete search history.

(56) References Cited

U.S. PATENT DOCUMENTS

| | | | | |
|---|---|---|---|---|
| 2001/0013915 | A1* | 8/2001 | Song | 349/141 |
| 2002/0030780 | A1* | 3/2002 | Nishida et al. | 349/141 |
| 2003/0184699 | A1* | 10/2003 | Matsumoto et al. | 349/141 |
| 2005/0180083 | A1* | 8/2005 | Takahara et al. | 361/152 |

FOREIGN PATENT DOCUMENTS

| | | |
|---|---|---|
| JP | A-2001-142092 | 5/2001 |
| JP | A-2001-235763 | 8/2001 |
| JP | A-2002-182230 | 6/2002 |

* cited by examiner

*Primary Examiner* — Lucy Chien  
(74) *Attorney, Agent, or Firm* — K&L Gates LLP (57) ABSTRACT

A liquid crystal display device includes a pair of substrates, a plurality of gate lines arranged in parallel, a plurality of common lines arranged in parallel, a plurality of source lines arranged in such a manner that the direction of the source lines intersects the direction of the gate lines and the common lines, thin-film transistors arranged in the vicinity of intersections of the gate lines and source lines, lower electrodes arranged in respective regions separated by the plurality of gate lines and the plurality of source lines, the lower electrodes being connected to the common lines and composed of a transparent conductive material, upper electrodes arranged on surfaces of the respective lower electrodes with an insulating film provided between the upper electrode and the lower electrode, each of the upper electrodes having a plurality of slits arranged in parallel with one another, the gate lines, the common lines, the source lines, the thin-film transistors, the lower electrodes, and upper electrodes being arranged on one of the pair of substrates, a liquid crystal layer arranged between the pair of substrates and driven by an electric field produced between the lower electrodes and the upper electrodes, and first conductive material layers arranged on surfaces of the common lines at intersections of the source lines and the common lines.

9 Claims, 7 Drawing Sheets

LIQUID CRYSTAL DISPLAY DEVICE, METHOD FOR PRODUCING SAME, AND ELECTRONIC APPARATUS

BACKGROUND

1. Technical Field

The present invention relates to a display device operating in a transverse-electric-field mode such as a fringe-field-switching (hereinafter, referred to as an "FFS") mode, a method for producing the device, and an electronic apparatus. In particular, the invention relates to a highly reliable liquid crystal display device in which in intersections of common lines and source lines, breaks in the source lines and short circuits between the common lines and the source lines are suppressed, the liquid crystal display device operating in transverse-electric-field mode, and relates to a method for producing the device and an electronic apparatus.

2. Related Art

In recent years, liquid crystal display devices have often been used in general electrical equipment as well as information and communication equipment. Liquid crystal display devices that have been commonly used each include a pair of substrates composed of, for example, glass, having electrodes and the like on surfaces of the substrates and a liquid crystal layer provided between the pair of substrates. A voltage is applied to the electrodes on the substrates to align liquid crystal molecules, thus changing light transmittance to display various images. Such liquid crystal display devices are said to operate in a longitudinal-electric-field mode. Longitudinal-electric-field liquid crystal display devices include liquid crystal display devices operating in a twisted-nematic (TN) mode and a vertical-alignment (VA) mode. These liquid crystal display devices disadvantageously have narrow viewing angle ranges. Improved longitudinal-electric-field liquid crystal display devices, e.g.$_{[d1]}$, multidomain-vertical-alignment (MVA) liquid crystal display devices, have thus been developed.

Unlike the foregoing longitudinal-electric-field liquid crystal display devices, liquid crystal display devices operating in a transverse-electric-field mode such as an in-plane switching (IPS) mode or the FFS mode have also been known, the transverse-electric-field liquid crystal display devices each including pairs of electrodes constituted by pixel electrodes and common electrodes only on one of the substrates.

Liquid crystal display devices operating in the IPS mode each include a pair of electrodes arranged on the same layer. An electric field is applied to a liquid crystal material in the direction substantially parallel to the substrate to align the liquid crystal molecules in the direction parallel to the substrate. Thus, such IPS-mode liquid crystal display devices advantageously have very wide viewing angle ranges compared with those of longitudinal-electric-field liquid crystal display devices. However, since IPS-mode liquid crystal display devices each include a pair of electrodes serving to apply an electric field to the liquid crystal material and being arranged on the same layer, liquid crystal molecules located above the pixel electrodes are not sufficiently driven, thus disadvantageously reducing transmittance and the like.

To overcome the foregoing problems with IPS-mode liquid crystal display devices, JP-A-2001-235763 and JP-A-2002-182230 disclose FFS-mode liquid crystal display devices. FFS-mode liquid crystal display devices each include pixel electrodes and common electrodes that apply an electric field to a liquid crystal layer, the pixel electrodes and the common electrodes being arranged as different layers that are disposed with an insulating film provided therebetween.

FFS-mode liquid crystal display devices have wide viewing angle ranges and high contrast compared with those of IPS-mode liquid crystal display devices. Furthermore, FFS-mode liquid crystal display devices can operate at lower voltages and display bright images owing to higher transmittance. Moreover, FFS-mode liquid crystal display devices have a large area of regions where pixel electrodes and common electrodes overlap in plan view, as compared with those of IPS-mode liquid crystal display devices, thereby secondarily resulting in a larger storage capacitance. This advantageously eliminates the need to separately form an auxiliary capacitance line.

An array substrate of an FFS-mode liquid crystal display device in the related art includes common electrodes (also referred to as "lower electrodes") arranged in respective pixels and composed of a transparent conductive material, an insulating film arranged on the surface of the common electrodes and composed of, for example, silicon nitride, and pixel electrodes (also referred to as "upper electrodes") arranged on surface portions of the insulating film corresponding to the common electrodes and composed of a transparent conductive material, the pixel electrodes each having a plurality of slits arranged in parallel with one another, and the common electrodes, the insulating film, and the pixel electrodes being arranged on a transparent substrate. The common electrodes and the pixel electrodes are composed of a transparent conductive material such as indium tin oxide (ITO) or indium zinc oxide (IZO). In such FFS-mode liquid crystal display devices in the related art, breaks or short circuits occur at positions where source lines intersect common lines or gate lines, in some cases. The breaks or short circuits occur more frequently at intersections of the source lines and the common lines than intersections of the source lines and the gate lines.

To examine the causes of these phenomena, the inventors have conducted intensive studies and found the main causes described below.

(1) The source lines and the gate lines are brought into contact with an etching solution twice. Thus, the source lines and the gate lines are excessively etched, so that surface states or cross-sectional shapes thereof change from their design states or shapes.

(2) The common electrodes are provided in respective pixels. However, the common electrodes provided in adjacent pixels are electrically connected to each other through only the common lines each having a width smaller than those of the uncovered gate electrodes, so that charges are liable to concentrate on the narrow common lines, thereby easily making a spark between each common line and a corresponding one of the source lines.

The reason the common lines and the gate lines are brought into contact with the etching solution twice is as follows. After the common lines and the gate lines are formed in parallel with one another, a film composed of a transparent conductive material is formed across the entire surface of a transparent substrate and then formed into a predetermined pattern by photolithography and etching, thereby forming the common electrodes. The common lines and the gate lines are usually composed of Mo-covered Al or an Al alloy and thus formed into predetermined patterns by wet etching. Also, the film composed of the transparent conductive material is patterned by wet etching.

The common lines and the gate lines having the predetermined patterns formed by wet etching are exposed to an etching solution again as the etching of the transparent conductive material proceeds. As a result, the gate lines and the common lines provided between adjacent pixels are brought into contact with the etching solution twice. Thus, the common lines and the gate lines are excessively etched, so that the surface states or the cross-sectional shapes thereof change from the design states or shapes. It is thus speculated that breaks of the source lines or short circuits are liable to occur at intersections between the source lines and the common lines and/or between the source lines and the gate lines.

SUMMARY

Such breaks of the source lines or short circuits can be suppressed by achieving a structure in which the common lines and the gate lines located at the intersections between the source lines and the common lines and between the source lines and the gate liens are not brought into contact with the etching solution during the formation of the common electrodes. The inventors have conducted intensive studies of a structure such that at least the common lines at the intersections of the source lines and the common lines are not brought into contact with the etching solution during the formation of the common electrodes, and have found a structure in which the a conductive material layer is arranged at intersections of the source lines and the common lines and, if necessary, intersections of the source lines and the gate lines before etching of the common electrodes. This finding has led to the completion of the invention.

An advantage of some aspects of the invention is that it provides a highly reliable display device operating in a transverse-electric-field mode, the device having a structure such that intersections between source lines and common liens and/or between source lines and gate lines are not brought into contact with an etching solution during common electrodes, and the structure suppressing breaks of the source lines and short circuits between the source lines and the common lines and between the source lines and the gate lines.

According to a first aspect of the invention, a liquid crystal display device includes a pair of substrates, a plurality of gate lines arranged in parallel, a plurality of common lines arranged in parallel, a plurality of source lines arranged in such a manner that the direction of the source lines intersects the direction of the gate lines and the common lines, thin-film transistors arranged in the vicinity of intersections of the gate lines and source lines, lower electrodes arranged in respective regions separated by the plurality of gate lines and the plurality of source lines, the lower electrodes being connected to the common lines and composed of a transparent conductive material, upper electrodes arranged on surfaces of the respective lower electrodes with an insulating film provided between the upper electrode and the lower electrode, each of the upper electrodes having a plurality of slits arranged in parallel with one another, the gate lines, the common lines, the source lines, the thin-film transistors, the lower electrodes, and upper electrodes being arranged on one of the pair of substrates, a liquid crystal layer arranged between the pair of substrates and driven by an electric field produced between the lower electrodes and the upper electrodes, and first conductive material layers arranged on surfaces of the common lines at intersections of the source lines and the common lines.

According to the first aspect of the invention, the first conductive material layers are arranged on surfaces of the common lines at the intersections of the source lines and the common lines. In other words, the surfaces of the common lines at the intersections of the source lines and the common lines are covered with the first conductive material layers. Thus, the surfaces of the common lines at the intersections of the source lines and the common lines are not exposed during the formation of the lower electrodes. The common lines are not excessively etched at the intersections of the source lines and the common lines. Thus, the surface state or cross-sectional shape of the common lines is not changed from the design state or shape thereof. In the case where the source lines are formed on the common lines with the insulating film provided between the source lines and the common lines so as to intersect the common lines, breaks of the source lines and short circuits between the source lines and the common lines due to static electricity are reduced.

It is preferred that each of the first conductive material layers have a size larger than the width of a corresponding one of the source lines and the width of a corresponding one of the common lines.

The first conductive material layers arranged on the surfaces of the common lines at the intersections of the source lines and the common lines may have a size equal to the width of the source lines or the common lines. In particular, the arrangement of the first conductive material layers each having a size larger than the widths of the source lines and the common lines results in smooth bumps and a reduction in the concentration of charges, thereby providing the significant effect of the invention. The first conductive material layers may be in the form of a rectangle, circle, ellipse, or polygon.

It is preferred that the first conductive material layers be composed of a material the same as that constituting the lower electrodes.

In this case, the first conductive material layers are composed of a material the same as that constituting the lower electrodes, i.e.$_{[d2]}$, a transparent conductive material. Thus, the first conductive material layers can be formed on the common lines simultaneously with the formation of the lower electrodes without an increase in the number of steps.

It is preferred that the first conductive material layers be integrally connected to the lower electrodes.

In this case, the first conductive material layers are composed of a material the same as that constituting the lower electrodes and are formed integrally with the lower electrodes, so that the entire surfaces of the common lines are covered with the transparent first conductive material layers. This results in a significant reduction in the resistance of the common lines and thus stabilizes the potential of each lower electrode serving as the common electrode, thereby improving nonuniformity in the display quality of the pixels to obtain a liquid crystal display device having excellent display quality.

It is preferred that the liquid crystal display device further include second conductive material layers arranged on surfaces of the gate lines at intersections of the source lines and the gate lines, in which the second conductive material layers are electrically isolated from the first conductive material layers.

The gate lines have a width larger than that of the common lines. Breaks of the source lines and short circuits between the source lines and the gate lines are less likely to occur compared with at the intersections of the common lines and the source lines. In the case where the second conductive material layers are arranged on the surfaces of the gate lines at the intersections of the source lines and the gate lines, the breaks of the source lines and the short circuits between the source lines and the gate lines are much less likely to occur. The second conductive material layers need to be electrically isolated from the first conductive material layers.

According to a second aspect of the invention, a method for producing a liquid crystal display device includes (1) forming a conductive layer across the entire surface of a transparent substrate and etching the conductive layer to form a plurality of gate lines having gate electrode portions and a plurality of common lines in such a manner that the gate lines and the common lines are in parallel with one another, (2) forming a transparent conductive layer across the entire surface of the resulting substrate and etching the transparent conductive layer to form lower electrodes electrically connected to the common lines and located at positions corresponding to respective pixels and to form first transparent conductive material layers on surfaces of the common lines each between at least adjacent lower electrodes, (3) forming a first insulating film across the entire surface of the resulting substrate, (4) forming a semiconductor layer across the entire surface of the first insulating film and etching the first insulating film to form semiconductor layers at positions corresponding to gate electrode portions, (5) forming a conductive layer across the entire surface of the resulting substrate and etching the conductive layer to form source lines such that the direction of the source lines intersects the direction of the gate lines and the common lines and to form drain electrodes and source electrodes in the respective pixels in such a manner that each of the source electrodes is electrically connected to a corresponding one of the source lines, (6) forming a second insulating film across the entire surface of the resulting substrate, (7) forming contact holes in portions of the second insulating film located on the drain electrodes in the respective pixels, (8) forming a conductive layer across the entire surface of the resulting substrate and etching the transparent conductive layer to form upper electrodes having a plurality of slits in the respective pixels and to electrically connect the upper electrodes to the respective drain electrodes, and (9) arranging the resulting substrate to face a color filter substrate and then filling a liquid crystal material into the gap between the substrates.

In this case, preferably, the method further includes in the step (2), forming a second transparent conductive material layers on surfaces of the gate lines at intersections of the source lines and the gate lines in such a manner that the second transparent conductive material layers are electrically isolated from the first transparent conductive material layers.

In this case, a liquid crystal display device having the foregoing advantages is produced by the method.

According to a third aspect of the invention, an electronic apparatus includes any one of the liquid crystal display devices described above.

The electronic apparatus according to the third aspect of the invention includes a highly reliable liquid crystal display device in which breaks of source lines and short circuits between the source lines and common lines are less likely to occur.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described below with reference to the attached drawings. In the embodiments, FFS-mode liquid crystal display devices are exemplified as liquid crystal display devices to embody the technical idea of the invention. However, the invention is not intended to be limited to such FFS-mode liquid crystal display devices. The invention is equally applicable to other embodiments falling within the scope of the appended claims. In the drawings used for illustration in this specification, layers and components are shown at different scales so as to be recognizable in the drawings and thus are not necessarily shown in proportion to their actual dimensions.

Figure 1:
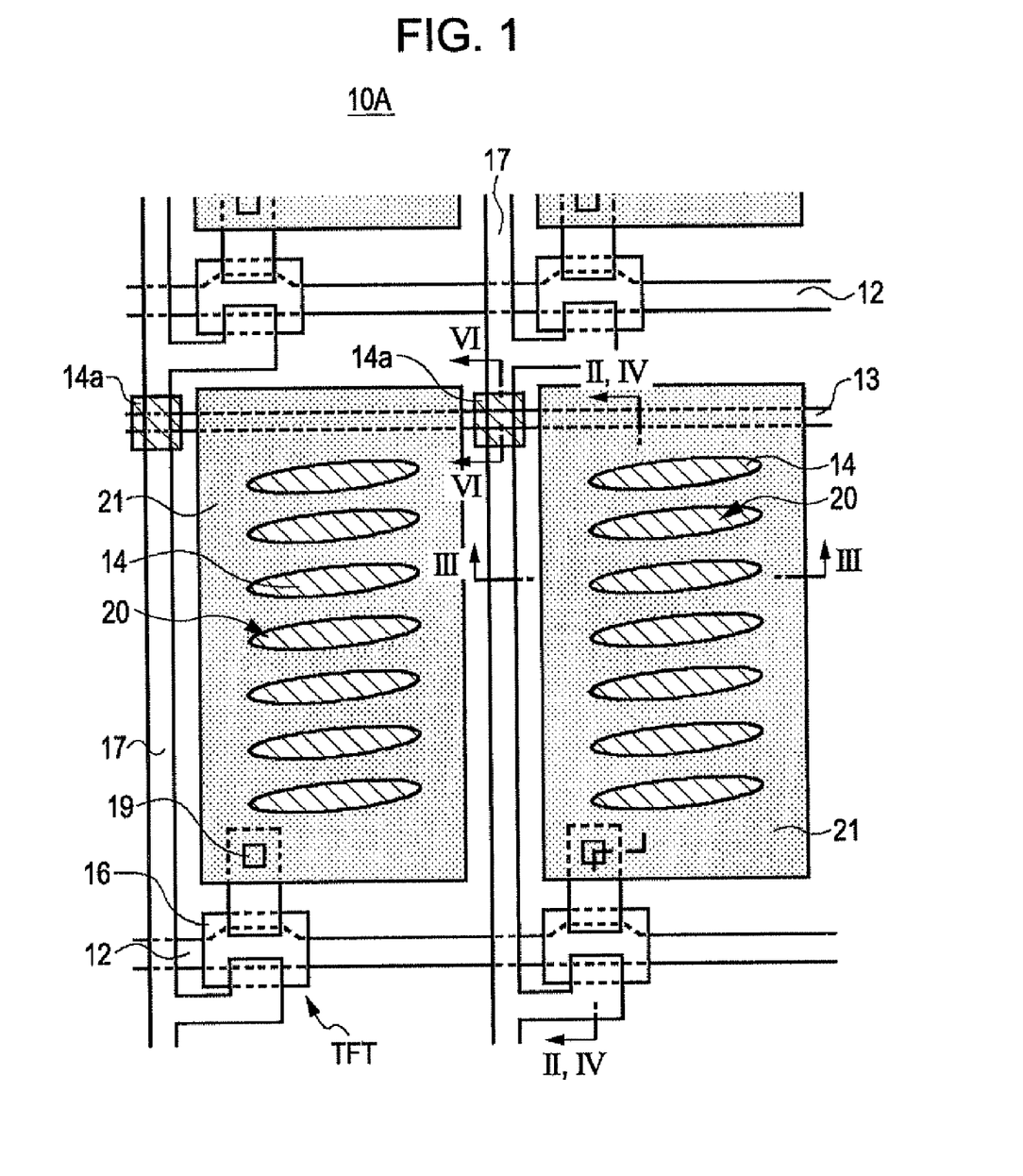
FIG. 1 is a schematic plan view illustrating two pixels on an array substrate of an FFS-mode liquid crystal display device according to an embodiment.
Figure 2:
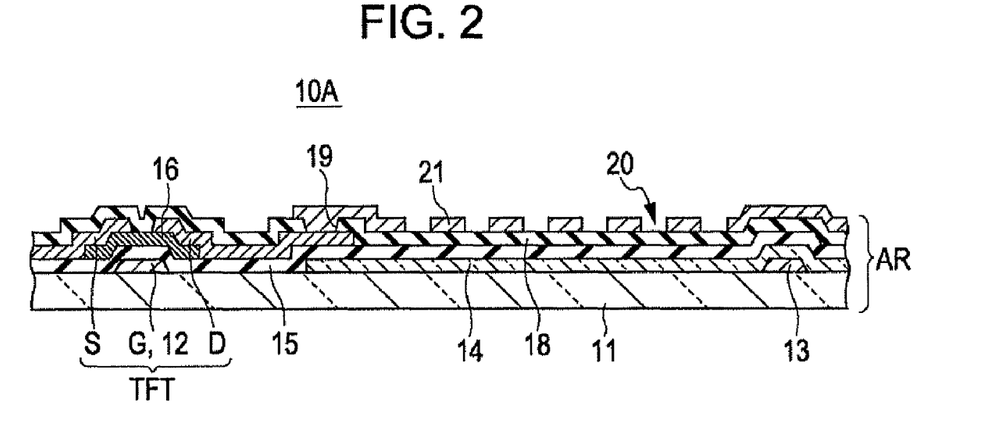
FIG. 2 is a schematic cross-sectional view taken along line II-II in FIG. 1.
Figure 3:
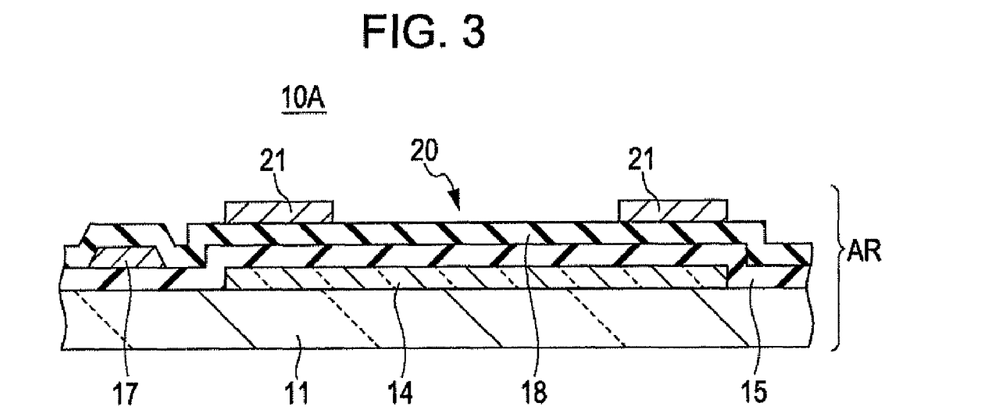
FIG. 3 is a schematic cross-sectional view taken along line III-III in FIG. 1.
Figure 5:
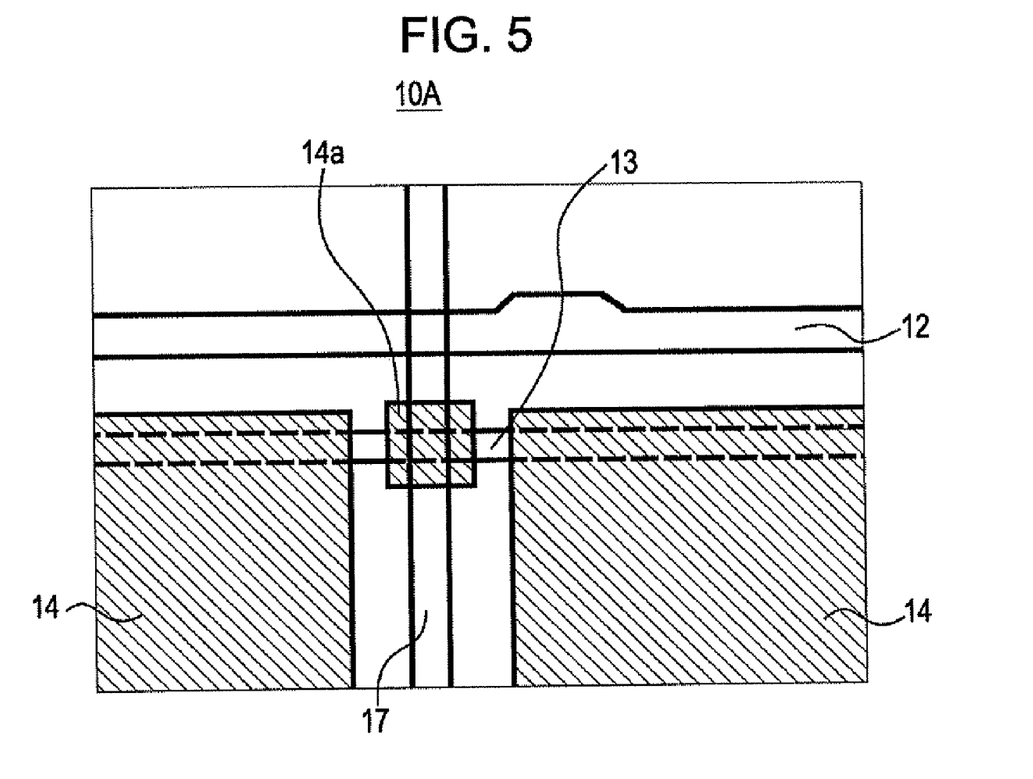
FIG. 5 is a plan view of intersections of source lines and common lines and intersections of the source lines and gate lines shown in FIG. 1 without upper electrodes and insulating films.
Figure 6:
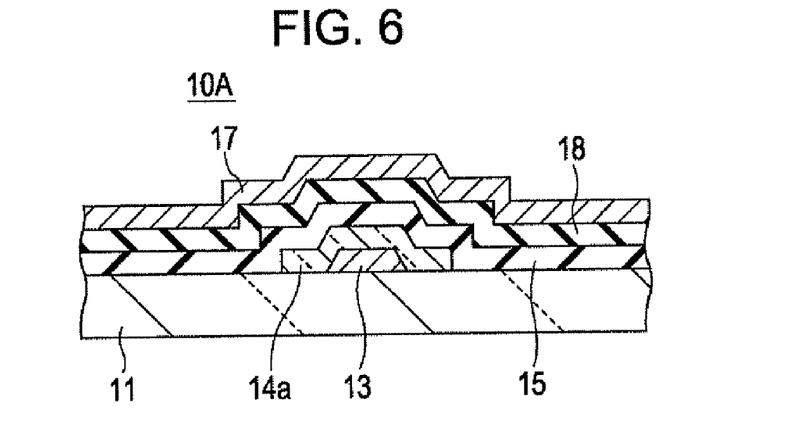
FIG. 6 is a cross-sectional view taken along line VI-VI in FIG. 1.
Figure 7:
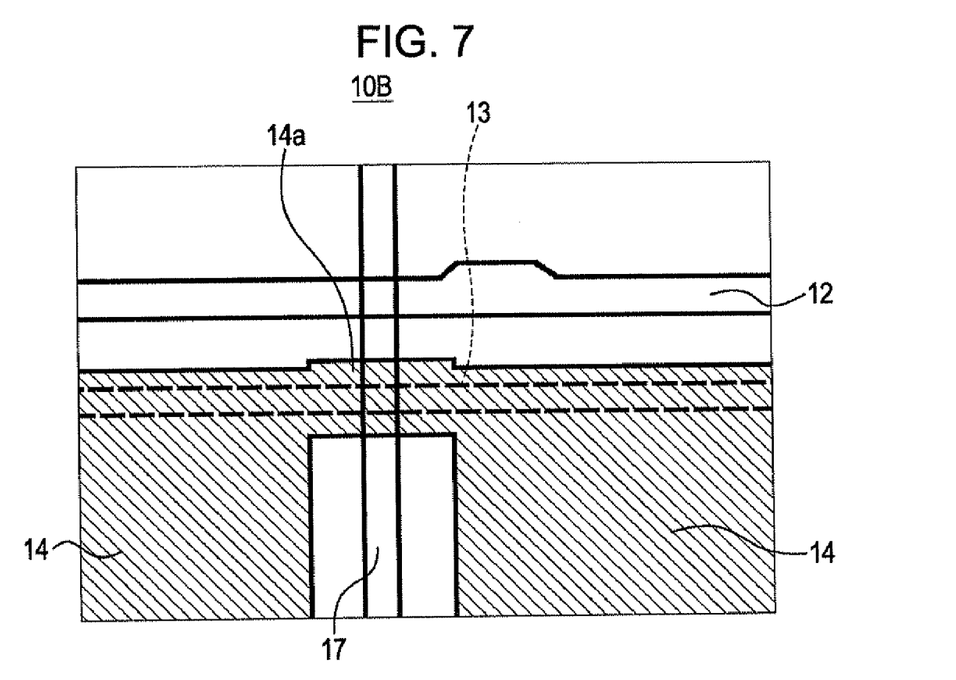
FIG. 7 is a plan view illustrating a first modification of the embodiment and corresponding to FIG. 6.
Figure 8:
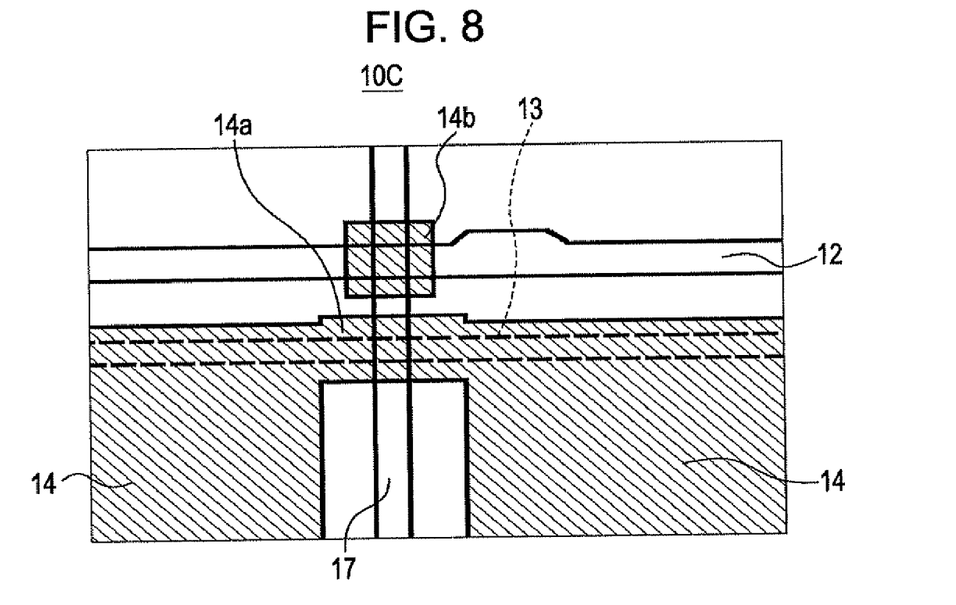
FIG. 8 is a plan view illustrating a second modification of the embodiment and corresponding to FIG. 6.
Figure 9:
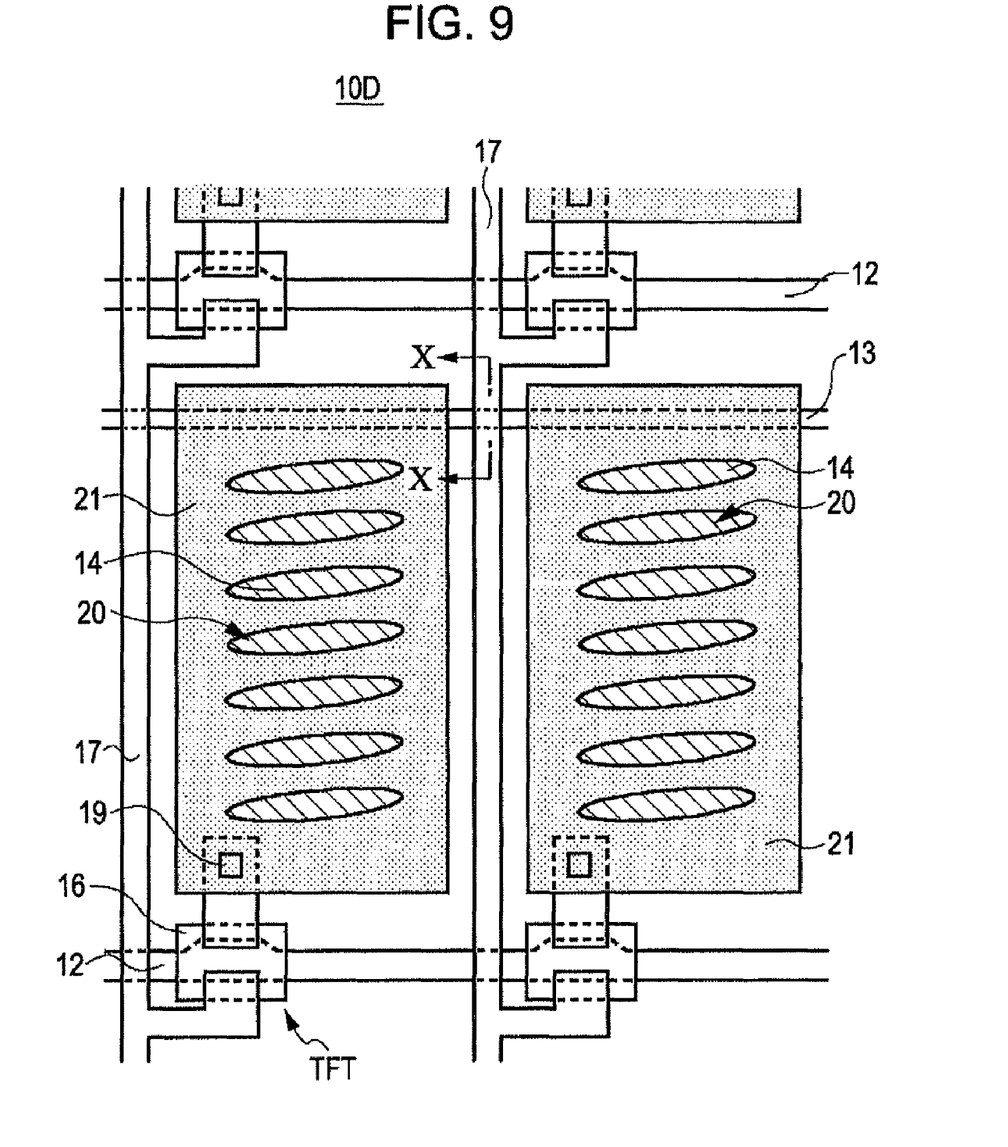
FIG. 9 is a schematic plan view illustrating two pixels on an array substrate of an FFS-mode liquid crystal display device according to a comparative embodiment.
Figure 10:
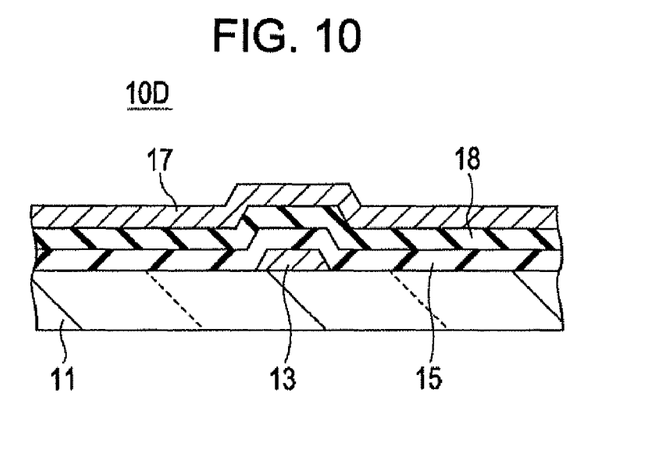
FIG. 10 is a cross-sectional view taken along line X-X in FIG. 9.
Figure 11A:
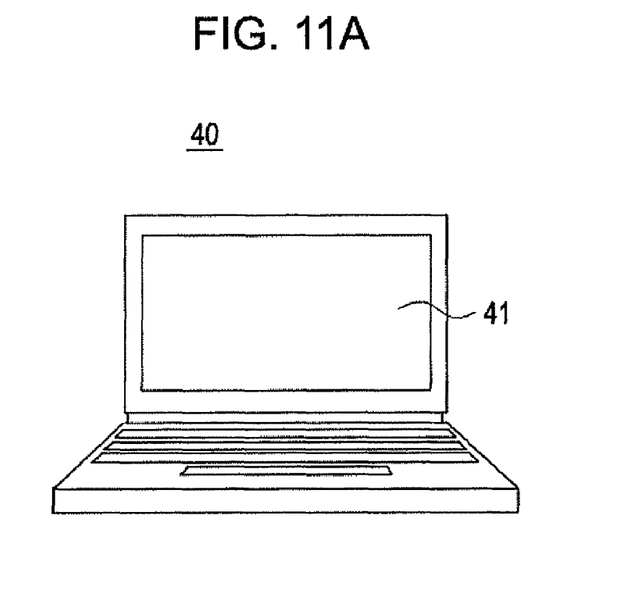
FIG. 11A illustrates a personal computer including a liquid crystal display device in accordance with an embodiment of the invention.
Figure 11B:
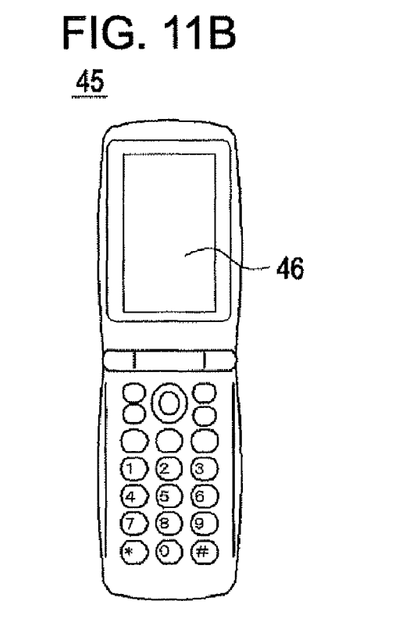
FIG. 11B illustrates a mobile phone including a liquid crystal display device in accordance with an embodiment of the invention.

FIG. 1 is a schematic plan view illustrating two pixels on an array substrate of an FFS-mode liquid crystal display device according to an embodiment. FIG. 2 is a schematic cross-sectional view taken along line II-II in FIG. 1. FIG. 3 is a schematic cross-sectional view taken along line III-III in FIG. 1. FIGS. 4A to 4G are cross-sectional views taken along line IV-IV and sequentially illustrating a process of producing a single pixel. FIG. 5 is a plan view of intersections of source lines and common lines and intersections of the source lines and gate lines shown in FIG. 1 without upper electrodes and insulating films. FIG. 6 is a cross-sectional view taken along line VI-VI in FIG. 1. FIG. 7 is a plan view illustrating a first modification of the embodiment and corresponding to FIG. 6. FIG. 8 is a plan view illustrating a second modification of the embodiment and corresponding to FIG. 6. FIG. 9 is a schematic plan view illustrating two pixels on an array substrate of an FFS-mode liquid crystal display device according to a comparative embodiment. FIG. 10 is a cross-sectional view taken along line X-X in FIG. 9. FIG. 11A illustrates a personal computer including a liquid crystal display device in accordance with an embodiment of the invention. FIG. 11B illustrates a mobile phone including a liquid crystal display device in accordance with an embodiment of the invention.

Embodiment

An FFS-mode liquid crystal display device 10A according to an embodiment will be described according to the sequence of steps in a production process with reference to FIGS. 1 to 6. An array substrate AR of the FFS-mode liquid crystal display device 10A according to this embodiment is produced by forming a two-layer film across the entire surface of a transparent substrate 11 such as a glass substrate, the two-layer film having a lower layer composed of Al and an upper layer composed of Mo, and subjecting the two-layer film to photolithography and wet etching to form a plurality of gate lines 12 and a plurality of common lines 13 constituted by two-layer lines each having the lower Al layer and the upper Mo layer, the gate lines 12 and the common lines 13 being arranged in parallel to one another (see FIG. 4A). In this case, although the common line 13 is arranged on the gate line 12 side of an adjacent pixel, the common line 13 may be arranged on the gate line 12 side of the pixel in which the common line 13 is arranged. Alternatively, the common line 13 may be arranged in a substantially intermediate position between adjacent gate lines 12.

Figures 4A, 4B:
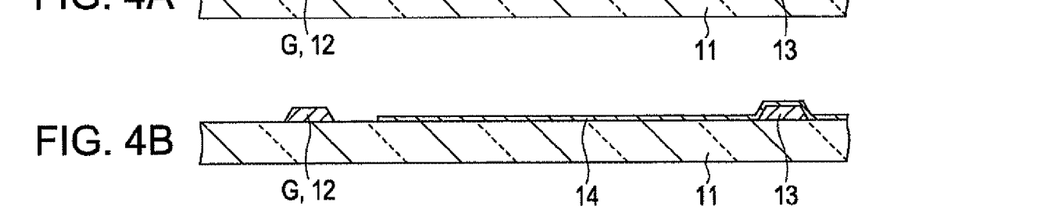
FIGS. 4A to 4G are cross-sectional views taken along line IV-IV and sequentially illustrating a process of producing a single pixel.
Figure 4C:
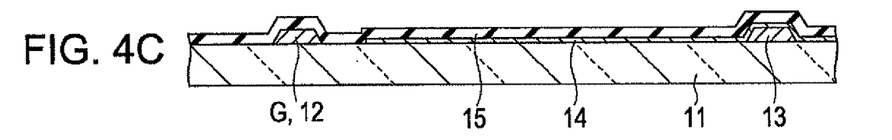
Figure 4D:
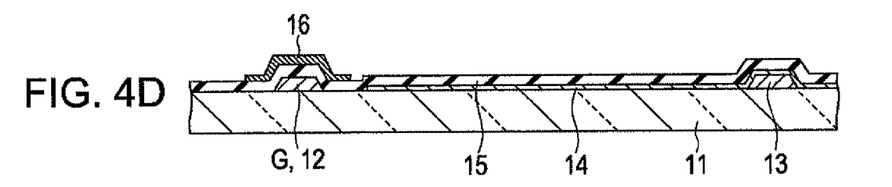

A transparent conductive layer composed of, for example, ITO is formed across the entire surface of the transparent substrate 11 having the gate lines 12 and the common lines 13 and subjected to photolithography and wet etching to form lower electrodes 14 (see FIG. 4B). At this time, transparent conductive material layers 14a each in the form of an island, for example, a rectangle are formed on portions of surfaces of the common lines 13 that will intersect source lines and that are located each located between adjacent pixels in such a manner that the transparent conductive material layers 14a each have a size larger than the width of the common lines 13 and the width of the source lines (see FIGS. 1, 5, and 6). The lower electrodes 14 are not connected to the gate lines 12 or gate electrodes (G). The lower electrodes 14 are electrically connected to the common lines 13 to function as common electrodes. The transparent conductive material layers 14a in the form of an island are electrically connected to the common lines 13. In this case, the transparent conductive material layers 14a is not directly connected to the lower electrodes 14. The reasons why the transparent conductive material layers 14a in the form of an island each have a size larger than the widths of the source lines and the common lines are that smooth bumps of the source lines to be formed in the subsequent step are obtained and that the concentration of charges due to static electricity is prevented.

The portions of the common lines 13 that will intersect the source lines are not brought into contact with an etching solution during the wet etching because the transparent conductive material layers 14a in the form of an island having a size larger than the widths of the common lines 13 and the skin layer are arranged on the portions of the surfaces of the common lines 13 that will intersect the source lines and that are each located between adjacent pixels. Thus, the surface state and the cross-sectional shape of the portions of the common lines 13 that will intersect the source lines can be formed as designed.

In this way, the lower electrodes 14 and the transparent conductive material layers 14a each in the form of an island are formed. Then a first insulating film 15 composed of silicon nitride is formed across the entire surface (see FIG. 4C). Subsequently, for example, a a-Si layer and an n+ a-Si layer are formed across the entire surface of the first insulating film 15 and subjected to photolithography and etching to form semiconductor layers 16 in respective regions where TFTs will be formed, the semiconductor layers 16 each being in the form of an island and constituted by the a-Si layer and the n+ a-Si layer (see FIG. 4D). Portions of the gate lines 12 located at positions where the semiconductor layers 16 are formed serve as gate electrodes G.

Figure 4E:
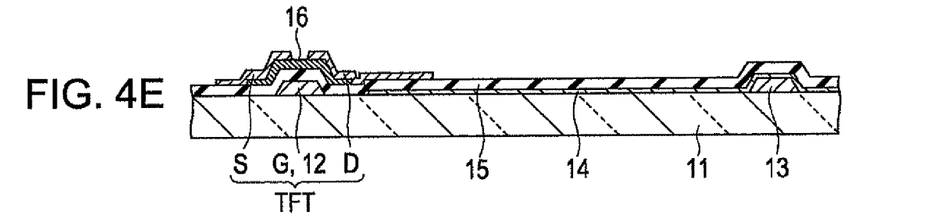
Figure 4F:
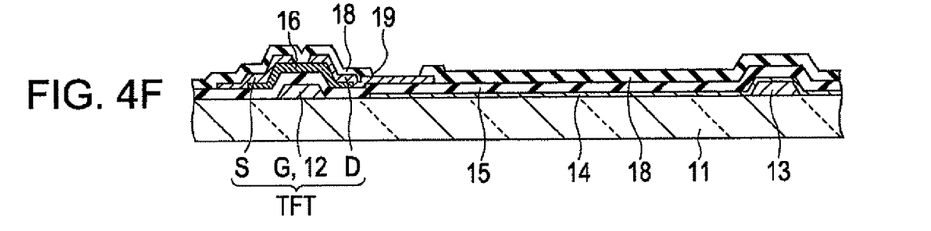
Figure 4G:
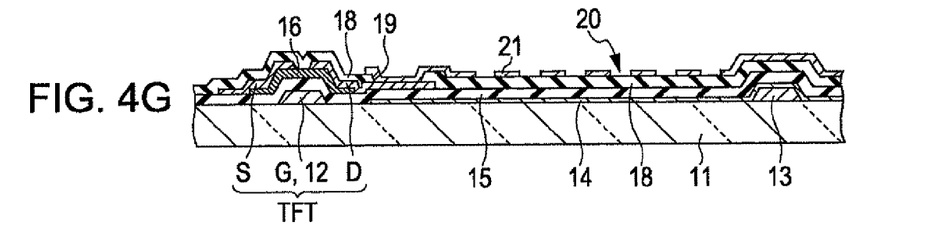

For example, a conductive layer having a three-layer structure of Mo/Al/Mo is formed across the entire surface of the transparent substrate 11 having the semiconductor layers 16 and subjected to photolithography and etching to form source lines 17 and drain electrodes D (see FIG. 4E). Source electrodes S and the drain electrodes D of the source lines 17 overlap the surfaces of the semiconductor layers 16.

An insulating film 18 composed of silicon nitride is formed across the entire surface of the resulting substrate. Contact holes 19 are formed in the insulating film 18 located at positions corresponding to the drain electrodes D to partially expose the drain electrodes D (see FIG. 4F). A transparent conductive layer composed of, for example, ITO is formed across the entire surface and subjected to photolithography and etching to form upper electrodes 21 in regions of the insulating film 18 separated by the gate lines 12 and the source lines 17 in such a manner that the pattern shown in FIG. 1 is obtained, the upper electrodes 21 each having a plurality of slits 20 for providing a fringe-field effect, and the slits being arranged in parallel (see FIG. 4G). Each of the upper electrodes 21 is electrically connected to a corresponding one of the drain electrodes D through a corresponding one of the contact holes 19 and thus functions as a pixel electrode.

A predetermined alignment layer (not shown) is formed across the entire surface to complete the array substrate AR. The resulting array substrate AR is arranged to face a separately formed color filter substrate. The periphery of the substrates is sealed with a sealing material. A liquid crystal material is filled into the gap between the substrates to obtain the FFS-mode liquid crystal display device 10A according to this embodiment. The color filter substrate (not shown) includes, in sequence, a transparent substrate such as a glass substrate, a color filter layer, an overcoat layer, and an alignment layer. The color filter substrate has substantially the same structure as those of liquid crystal display devices operating in a twisted nematic (TN) mode in the related art, except that common electrodes are not arranged.

The FFS-mode liquid crystal display device 10A according to this embodiment includes the transparent conductive material layers 14a arranged at intersections of the source lines 17 and the common lines 13, so that the common lines 13 located at the intersections of the source lines 17 and the common lines 13 are not brought into contact with an etching solution during the formation of the lower electrodes 14. Thus, the common lines 13 located at the intersections of the source lines 17 and the common lines 13 have the surface state and the cross-sectional shape as designed. Therefore, breaks are less likely to occur at the intersections of the source lines 17 and the common lines 13. Furthermore, even when static electricity is induced to the common lines 13, the induced static charges are dispersed by the transparent conductive material layers 14a in the form of an island. Thereby, an electrostatic breakdown is less likely to occur between the common lines 13 and the source lines 17.

In the foregoing embodiment, the transparent conductive material layers 14a in the form of an island composed of a material the same as that constituting the lower electrodes 14 are arranged on the common lines 13 at the intersections of the source lines 17 and the common lines 13. Alternatively, the use of another conductive material may also provide the foregoing effect. In the case where another metallic conductive material is used, however, a step of forming a layer composed of the conductive material is separately required. Thus, no advantage is provided by the use of another conductive material. In the foregoing embodiment, the transparent conductive material layers 14a in the form of an island have a rectangular shape. Alternatively, the transparent conductive material layers 14a may be in the form of a circle, ellipse, or polygon. In the foregoing embodiment, the lower electrodes 14 and the upper electrodes 21 are composed of ITO. Alternatively, the use of IZO also provides the same effect. Furthermore, in the foregoing embodiment, the gate lines and the source lines are constituted by the two-layer structure of Mo/Al or the three-layer structure of Mo/Al/Mo. Alternatively, for example, a Nd—Al alloy may be used in place of Al.

In the foregoing embodiment, the transparent conductive material layers 14a in the form of an island composed of a material the same as that constituting the lower electrodes 14 are arranged on the common lines 13 at the intersections of the source lines 17 and the common lines 13. Alternatively, the transparent conductive material layers 14a may have another structure as long as the transparent conductive material layers 14a are arranged on at least the common lines 13 at the intersections of the source lines 17 and the common lines 13. Also in this case, the same effect can be provided.

Liquid crystal display devices according to modifications of the invention will be described with reference to FIGS. 7 and 8. In FIGS. 7 and 8, the same components shown in FIG. 5 are designated using the same reference numerals, and the detailed description is omitted. In a liquid crystal display device 10B according to a first modification shown in FIG. 7, although the transparent conductive material layers 14a are in the form of an island in the foregoing embodiment, the transparent conductive material layers 14a covers the entire surface of the common lines 13 in the first modification. In other words, in the liquid crystal display device 10B, adjacent lower electrodes 14 are electrically connected to each other through not only the common lines 13 but also the transparent conductive material layers 14a arranged on the common lines 13. Thus, in the liquid crystal display device 10B, the resistance of the common lines 13 is substantially reduced to stabilize the potential of each lower electrode 14 functioning as a common electrode, improving nonuniformity in display quality of the pixels. Thereby, the liquid crystal display device 103 having excellent display quality is obtained.

In a liquid crystal display device 10C according to a second modification shown in FIG. 8, transparent conductive material layers 14b in the form of an island are further arranged on surfaces of the gate lines 12 at intersections of the source lines 17 and the gate lines 12 in addition to the structure of the liquid crystal display device 10B according to the first modification. The gate lines 12 each have a width larger than that of the common lines 13; hence, breaks of the source lines and short circuits between the source lines and the gate lines due to static electricity at the intersections of the source lines and the gate lines are less likely to occur. The arrangement of the transparent conductive material layers 14b on the surfaces of the gate lines 12 at the intersections of the source lines 17 and the gate lines 12 provides the same effect as the liquid crystal display device 10B according to the first modification and further inhibits the occurrence of the breaks of the source lines and the short circuits between the source lines and the gate lines due to static electricity at the intersections of the source lines and the gate lines.

Comparative Embodiment

An FFS-mode liquid crystal display device 10D according to a comparative embodiment will be described according to the sequence of steps in a production process with reference to FIGS. 9 and 10. The FFS-mode liquid crystal display device 10D according to the comparative embodiment differs from the FFS-mode liquid crystal display device 10A according to the foregoing embodiment only in that the transparent conductive material layers 14a in the form of an island are not arranged on the common lines 13 at the intersections of the source lines 17 and the common lines 13. Accordingly, hereinafter, the FFS-mode liquid crystal display device 10D according to the comparative embodiment will be described with reference to FIGS. 1 to 4, in which the same components as in the FFS-mode liquid crystal display device 10A according to the foregoing embodiment are designated using the same reference numerals.

An array substrate AR of the FFS-mode liquid crystal display device 10D according to the comparative embodiment is produced by forming a two-layer film across the entire surface of a transparent substrate 11 such as a glass substrate, the two-layer film having a lower layer composed of Al and an upper layer composed of Mo, and subjecting the two-layer film to photolithography and wet etching to form a plurality of gate lines 12 and a plurality of common lines 13 constituted by two-layer lines each having the lower Al layer and the upper Mo layer, the gate lines 12 and the common lines 13 being arranged in parallel to one another. In this step, the gate lines 12 and the common lines 13 are brought into contact with an etching solution for the first time. Then a transparent conductive layer composed of, for example, ITO is formed across the entire surface of the transparent substrate 11 having the gate lines 12 and the common lines 13. Up to this point, the same production process as that of the FFS-mode liquid crystal display device 10A according to the embodiment is employed.

A lower electrodes 14 are formed by photolithography and wet etching so as to be electrically connected to the common lines 13 but so as not to be electrically connected to the gate lines 12 or gate electrodes G. At this point, the gate lines 12 and the common lines 13 are covered with the transparent conductive layer before wet etching. When predetermined portions of the transparent conductive layer are completely removed by etching, the gate lines 12 and the common lines 13 are partially exposed to an etching solution. In other words, at this point, the gate lines 12 and the common lines 13 are brought into contact with the etching solution for the second time. The transparent conductive layer preferably has a uniform thickness. However, the transparent conductive layer has nonuniformity in thickness to some extent because of irregularities due to the gate lines 12 and the common lines 13. Moreover, the etching rate of the transparent conductive layer varies from one portion to another because a stirring state is not generally uniform during wet etching. Thus, a period of time required to remove the transparent conductive layer arranged on the gate lines 12 and the common lines 13 by etching varies from one portion to another.

Therefore, portions of the gate lines 12 and the common lines 13 exposed by etching the transparent conductive layer at a higher etching rate are in contact with the etching solution until other portions of the transparent conductive layer are removed by etching at a lower etching rate. The etching solution for the transparent conductive layer is acidic. The acidic etching solution can dissolve Mo, Al, and Al alloys. The portions of the gate lines 12 and the common lines 13 exposed by etching the transparent conductive layer at a higher etching rate are etched with the etching solution for the transparent conductive layer. Thus, in the array substrate AR of the FFS-mode liquid crystal display device 10D according to the comparative embodiment, the gate lines 12 and the common lines 13 have cross-sectional shapes different from the design shapes or smaller widths.

Steps from a step subsequent to the formation of the lower electrodes 14 to the completion of the FFS-mode liquid crystal display device 10D are the same as in the FFS-mode liquid crystal display device 10A according to the foregoing embodiment, and the detailed description is omitted. In the resulting FFS-mode liquid crystal display device 10D, since the gate lines and the common lines located between adjacent pixels are brought into contact with the etching solution twice, the common lines and the gate lines are excessively etched, so that the surface states or cross-sectional shapes thereof are changed from the designed states or shapes. In the FFS-mode liquid crystal display device 10D according to the comparative embodiment, therefore, breaks and short circuits occur frequently at intersections between the source lines and the common lines and between the source lines and the gate lines.

The liquid crystal display devices according to the embodiment and the modifications of the invention have been described above. Such liquid crystal display devices according to the embodiment and the modifications of the invention can be used in electronic apparatuses such as personal computers, mobile phones, and personal digital assistants. FIG. 11A exemplary shows a liquid crystal display device 41 incorporated in a personal computer 40. FIG. 11B exemplary shows an FFS-mode semi-transmissive liquid crystal display panel 46 incorporated in a mobile phone 45. Detailed descriptions of basic structures of the personal computer 40 and the mobile phone 45 are omitted because they are well known to those skilled in the art.

What is claimed is:

1. A liquid crystal display device comprising:
a pair of substrates;
a plurality of gate lines arranged in parallel;
a plurality of common lines arranged in parallel and formed directly on one of the substrates;
a plurality of source lines arranged in such a manner that the direction of the source lines intersects the direction of the gate lines and the common lines;
thin-film transistors arranged in the vicinity of intersections of the gate lines and source lines;
lower electrodes arranged in respective regions separated by the plurality of gate lines and the plurality of source lines, the lower electrodes being connected to the common lines and composed of a transparent conductive material;
upper electrodes arranged on surfaces of the respective lower electrodes with an insulating film provided between the upper electrode and the lower electrode, each of the upper electrodes having a plurality of slits arranged in parallel with one another, the gate lines, the common lines, the source lines, the thin-film transistors, the lower electrodes, and upper electrodes being arranged on one of the pair of substrates;
a liquid crystal layer arranged between the pair of substrates and driven by an electric field produced between the lower electrodes and the upper electrodes; and
first conductive material layers that are different than the common lines are arranged on surfaces of and directly contacting the common lines at intersections of the source lines and the common lines, and the first conductive material layers arranged so as to not overlap with positions occupied by the thin-film transistors,
wherein each of the first conductive material layers has a size larger than the width of a corresponding one of the source lines and the width of a corresponding one of the common lines.

2. An electronic apparatus comprising:
the liquid crystal display device according to claim 1.

3. A liquid crystal display device comprising:
a pair of substrates;
a plurality of gate lines arranged in parallel;
a plurality of common lines arranged in parallel and formed directly on one of the substrates;
a plurality of source lines arranged in such a manner that the direction of the source lines intersects the direction of the gate lines and the common lines;
thin-film transistors arranged in the vicinity of intersections of the gate lines and source lines;
lower electrodes arranged in respective regions separated by the plurality of gate lines and the plurality of source lines, the lower electrodes being connected to the common lines and composed of a transparent conductive material;
upper electrodes arranged on surfaces of the respective lower electrodes with an insulating film provided between the upper electrode and the lower electrode, each of the upper electrodes having a plurality of slits arranged in parallel with one another, the gate lines, the common lines, the source lines, the thin-film transistors, the lower electrodes, and upper electrodes being arranged on one of the pair of substrates;
a liquid crystal layer arranged between the pair of substrates and driven by an electric field produced between the lower electrodes and the upper electrodes; and
first conductive material layers that are different than the common lines are arranged on surfaces of and directly contacting the common lines at intersections of the source lines and the common lines, and the first conductive material layers arranged so as to not overlap with positions occupied by the thin-film transistors,
wherein the first conductive material layers are composed of a material the same as that constituting the lower electrodes.

4. The liquid crystal display device according to claim 3, wherein the first conductive material layers are integrally connected to the lower electrodes.

5. An electronic apparatus comprising:
the liquid crystal display device according to claim 3.

6. A liquid crystal display device comprising:
a pair of substrates;
a plurality of gate lines arranged in parallel;
a plurality of common lines arranged in parallel and formed directly on one of the substrates;
a plurality of source lines arranged in such a manner that the direction of the source lines intersects the direction of the gate lines and the common lines;
thin-film transistors arranged in the vicinity of intersections of the gate lines and source lines;
lower electrodes arranged in respective regions separated by the plurality of gate lines and the plurality of source lines, the lower electrodes being connected to the common lines and composed of a transparent conductive material;
upper electrodes arranged on surfaces of the respective lower electrodes with an insulating film provided between the upper electrode and the lower electrode, each of the upper electrodes having a plurality of slits arranged in parallel with one another, the gate lines, the common lines, the source lines, the thin-film transistors, the lower electrodes, and upper electrodes being arranged on one of the pair of substrates;
a liquid crystal layer arranged between the pair of substrates and driven by an electric field produced between the lower electrodes and the upper electrodes;
first conductive material layers that are different than the common lines are arranged on surfaces of and directly contacting the common lines at intersections of the source lines and the common lines, and the first conductive material layers arranged so as to not overlap with positions occupied by the thin-film transistors; and second conductive material layers arranged on surfaces of the gate lines at intersections of the source lines and the gate lines, wherein the second conductive material layers are electrically isolated from the first conductive material layers.

7. An electronic apparatus comprising:
the liquid crystal display device according to claim 6.

8. A liquid crystal display device comprising:
a pair of substrates;
a plurality of gate lines;
a plurality of common lines formed directly on one of the substrates;
a plurality of source lines intersecting with the gate lines;
lower electrodes;
upper electrodes arranged on the respective lower electrodes with an insulating film provided between the upper electrode and the lower electrode, each of the upper electrodes having a plurality of slits;
a liquid crystal layer arranged between the pair of substrates and driven by an electric field produced between the lower electrodes and the upper electrodes; and
first conductive material layers that are different than the common lines are arranged at intersections of the source lines and the common lines and at a distance away from intersections between the gate lines and the source lines so as to not overlap with the gate lines, the first conductive material layers being in direct contact with the common lines, wherein each of the first conductive material layers has a size larger than the width of a corresponding one of the source lines and the width of a corresponding one of the common lines.

9. A liquid crystal display device comprising:
a pair of substrates;
a plurality of gate lines;
a plurality of common lines formed directly on one of the substrates;
a plurality of source lines;
lower electrodes;
upper electrodes arranged on the respective lower electrodes with an insulating film provided between the upper electrode and the lower electrode, each of the upper electrodes having a plurality of slits;
a liquid crystal layer arranged between the pair of substrates and driven by an electric field produced between the lower electrodes and the upper electrodes; and
first conductive material layers that are different than the common lines are arranged at intersections of the source lines and the common lines and at a distance away from intersections between the gate lines and the source lines so as to not overlap with the gate lines, the first conductive material layers being in direct contact with the common lines, wherein the first conductive material layers are composed of a material the same as that constituting the lower electrodes.

\* \* \* \* \*